Oct. 25, 1960

D. P. BERGSTROM 2,957,347

APPARATUS FOR GAUGING LIQUID LEVEL

Filed Dec. 5, 1957

INVENTOR.
DANIEL P. BERGSTROM

BY

ATTORNEY

United States Patent Office 2,957,347
Patented Oct. 25, 1960

2,957,347
APPARATUS FOR GAUGING LIQUID LEVEL

Daniel P. Bergstrom, Claymont, Del., assignor to Sun Oil Company, Philadelphia, Pa., a corporation of New Jersey Filed Dec. 5, 1957, Ser. No. 700,786

1 Claim. (Cl. 73—321)

This invention relates to apparatus for measuring the liquid contents of floating roof tanks.

One of the problems encountered in determining the liquid contents of floating roof storage tanks as used in the petroleum industry is the determination of the quantity of liquid displaced by the floating roof. The volume or depth of the liquid supporting the floating roof can be readily and accurately measured by subtracting the actual or average depth of the floating roof from a rooftop indicated depth measurement.

The quantity of liquid displaced by the roof is a variable quantity. It is affected by wind, rain and snow loads as well as by temperature and physical changes on or within the roof. To give an accurate measure of the stored liquid contents in such a tank this displaced liquid volume must be readily ascertainable at any time a measurement is required. It is therefore an object of this invention to provide means for measuring the depth of liquid displaced by a floating roof in a storage vessel. Another object is to automatically include this displaced depth of liquid in a single gauging operation wherein the body of liquid supporting the floating roof is included. And still another object of this invention is to provide means for obtaining roof displaced liquid and supporting liquid volumes in one operation with a single means, easily operated to give exact results at a convenient location externally of the storage tank.

These and other objects of this invention as may appear from this specification will be best understood from a description of the accompanying drawings which illustrate a preferred embodiment thereof and in which.

As indicated above, the liquid volume of the stored contents of a floating roof tank consist of two parts. One is the bulk of liquid contained in the tank and supporting the roof and the other is the displaced volume of liquid filling the floating roof irregularities of design and manufacture and around the roof periphery. This second volume varies with the type, style and manufacturer as well as with temperature and roof accumulations of weather elements. The effect of such combinations of variables changes from time to time, must be measured frequently and may amount to several hundred barrels of stored liquid. A device capable of accurately indicating both the roof displaced depth and the supporting depth of the stored liquid in one place with a single operation will form a perfect solution to these problems.

Such a device is disclosed here and can be generally described as a float-within-the-floating-roof combination. A small dimensional float is adapted to operate within a substantially vertical aperture in the pontoon structure forming the floating roof. An adjustable stop means connected to the top of the floating-roof portion is positioned to stop the small float at an elevation indicating the top of the pontoon. This elevation is indicated on the indicia of a flexible tape conducted by pulleys to a reel supported at a convenient reading point. Before lifting the float to the "stopped" position, an adjustable marker such as a wheel with indicia on the periphery which normally floats on the tape reel supporting shaft, is locked in rotatable association with the reel and with zero of the wheel set at a datum marker. Lifting the small float to engage the pontoon mounted stops then moves both the tape and the marker wheel to indicate two measurements, one for the depth of liquid below the bottom surface of the pontoon, the other showing the depth of displaced liquid above the pontoon bottom. The two liquid depths added together give the total depth which is readily corrected to volume by suitable tables calculated for the purpose.

Figure 1:
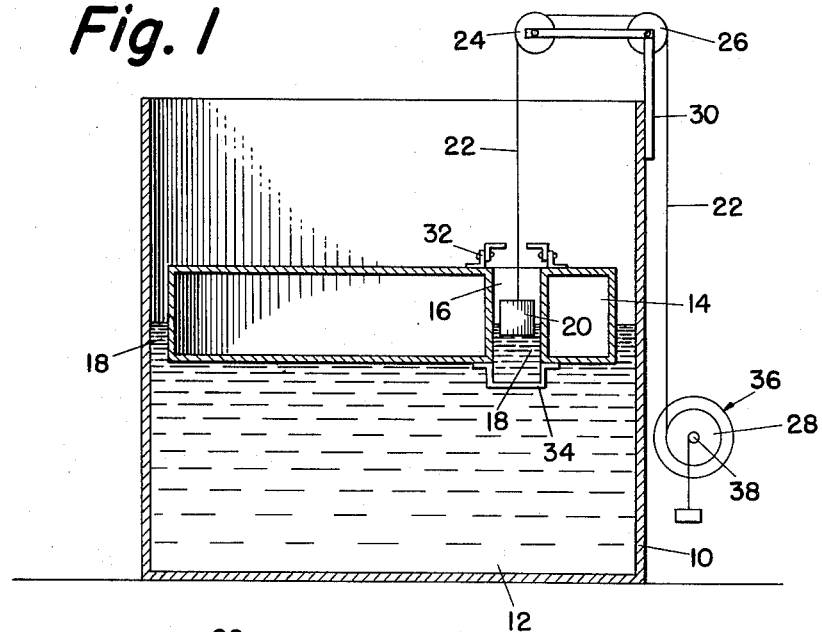
Figure 1 is an elevational view, partly in section, of the measuring device in cooperation with floating roof tank elements.

A detailed description of the construction and operation of the device as broadly described above, will make clear the disclosure. Figure 1 illustrates a floating roof storage tank 10 in which the stored liquid 12 supports a pontoon 14. A substantially vertical aperture 16, passing completely through pontoon 14, admits the stored liquid 12 to assume a displaced level in and about the pontoon as indicated at 18.

Within the aperture 16 and freely slidable relative to the pontoon a float 20 of relatively small dimensions is suspended. A flexible tape 22 with measuring indicia thereon is connected to the float 20 and passes over pulleys 24 and 26 to wind on reel 28 of the measuring device. Pulleys 24 and 26 are supported in operating alignment between float 20 and reel 28 by any convenient support means such as the bracket 30 shown. Adjustable stop means 32 mounted on the upper surface of pontoon 14 limits the upward movement of float 20 while a fixed stop means 34 performs the same service for downward movement, on the lower pontoon surface.

Figure 2:
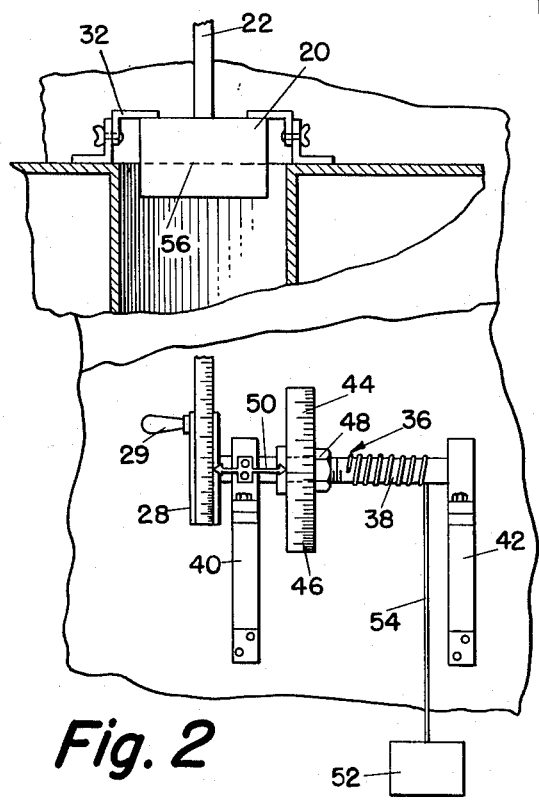
Figure 2 is a diagrammatic view of the elements of the measuring device in one of the operating positions.

The indicating or measuring means noted by the inclusive number 36 of which reel 28 and tape 22 are cooperating elements is shown in two views in Figures 1 and 2. Figure 1 shows the indicating means positioned at a convenient level outside tank 10 and in cooperation with the above-detailed elements of the combination. Figure 2 illustrates one form of suggested indicator means in detail which is acceptable as part of this device; the float 20 in aperture 16 of pontoon 14 is also illustrated in one of its two operating positions.

Continuing to describe Figure 2, the components of the indicating or measuring means 36 are illustrated. Shaft 38, supported by bearings 40 and 42 mounts reel 28 and a wheel 44. This wheel 44 is calibrated on the periphery as at 46 into units proportionate of measurement as compared with the indicia on tape 22 and measures the depth of the displaced liquid in and around pontoon 14, as later disclosed. For example, regardless of the physical measurements of the wheel, it is divided at the periphery markings into divisions of the pontoon depth and subdivided further to conform to fractions of the measuring tape indicia. During the measuring operation the calibrated wheel 46, floating freely on shaft 38, is set on the shaft to measure against fixed datum 50, as by locking means 48 comprising a wedge, pin, lock-nut and washer, or other like element. Reel 28 is then cranked as by handle 29 to raise float 20 until stopped and the indicia on tape 22 read against the datum 50 together with the indicia shown on wheel 44. Proper setting of wheel 44 relative to a datum 50 is required before the operation. Tension on tape 22 is maintained by weight 52 suspended in counter-winding relation on shaft 38 by cable 54.

Figure 3:
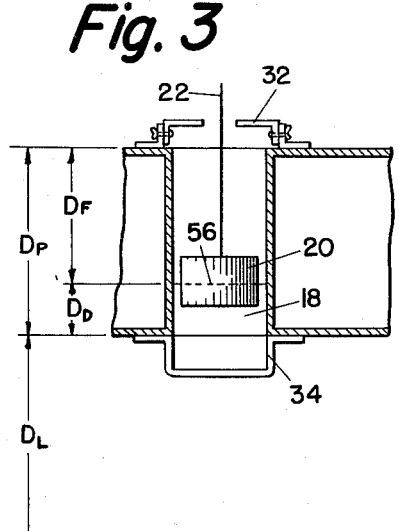
Figure 3 is a diagrammatic view of the elements similar to Figure 2, but in the second operating position, this figure including lettered symbols to assist in understanding the operation of the device.

Before describing the operation of the device which will be primarily with reference to Figure 3, although all figures of the drawing and the above structural description are needed for a complete understanding, Figures 2 and 3 will be compared. Float 20 is shown in two positions, differing in each of these figures. In Figure 2 it is shown against stop 32 which position places line 56, the depth of flotation line, in exact alignment with the upper surface of pontoon 14. Figure 3 shows the float 20 floating in the displaced portion 18 of liquid 12 with line 56 at the liquid surface level. Additionally, Figure 3 shows distance measuring symbols applied to the float pontoon and tank. These will be discussed in the description of operation, which follows.

Normally the float 20, as distinguished from the floating roof which is called pontoon 14, rests on the surface of the displaced liquid portion 18, in the aperture 16 of pontoon 14. A measure, on tape 22 as wound on reel 28 against datum 50, is obtained by lifting the float 20 into contact with stop 32 as shown in Figure 2. This measurement indicates the depth of the liquid supporting pontoon 14 symbolized in Figure 3 by the letters $D_L$.

The depth $D_L$ is accurately obtained by pre-establishing the relative positions of float 20, adjustable stop 32, a datum 50 and the length of tape 22. Depending on the specific gravity of the stored liquid, the depth to which float 20 will sink, will vary. This depth, indicated by line 56, is marked on float 20. Adjustable stops 32 are raised or lowered until line 56 is level with the top of pontoon 14 when float 20 is lifted into the upper position as shown in Figure 2. The depth of the pontoon $D_P$ being known or measurable is the quantity by which tape 22 is shortened. Thus when tape 22 is read with float 20 against stops 32 raised by rotating reel 28 with handle 29, datum 50 measures the depth $D_L$ of the supporting liquid.

Wheel 44 with indicia designed to subdivide the tape measurement over the depth of the pontoon $D_P$ normally floats on shaft 38. At the start of the measuring free of engagement with shaft 38, wheel 44 is adjusted to show zero against datum 50 and is fixed to shaft 38 by locking means 48. Reel 28 is cranked by handle 29, lifting float 20 into contact with stops 32 as shown in Figure 2. Tape 22 and wheel 44 are then read against datum 50. Tape 22 reads the depth of liquid $D_L$ supporting pontoon 14. Wheel 44, having a circumference equal to $D_P$, is lifted through $D_P$ leaving a difference of $D_D$, or the depth of the displaced liquid in and around pontoon 14. By suitable inversion of the scale on wheel 44, this depth $D_D$ may be read directly from this wheel. The liquid volumes as determined from tables prepared for each of these dimensions, are easily determined. When added they measure the complete liquid volume in the tank.

It will be evident to those versed in the art that it is necessary to adjust the adjustable stops 32 in order to accurately measure $D_D$ for every change in stored liquid specific gravity. Once so adjusted, however, the measure $D_D$ except for temperature variations will remain fairly constant. Based on this fact, the device as disclosed readily becomes a mechanism for checking the operability of a floating roof tank. Should the pontoon sink to where $D_F$ reflects a dimension too little for any external loading which might be experienced, or under no load at all, a defect is indicated. To the contrary should the determined depth of displaced liquid $D_D$ become diminished below normal measure, it would indicate that pontoon 14 had become "hung-up" or wedged.

The device as described, it will be understood, is disclosed in a preferred form. Many changes can be adopted which are foreseeable by the inventor as merely mechanical improvements not amounting to invention. For example, the number of floats can be multiplied for use in several apertures in the pontoon to measure at peripherally spaced locations. Or, one float may be used in the middle of the pontoon, to determine on unevenly floating pontoon and correct for the same.

I claim:

A liquid measuring device for floating roof tanks comprising a float adapted to be inserted in an aperture in the floating roof and adapted to slide therein, said float being normally supported by the liquid within said aperture, stop means mounted on said roof for stopping the vertical upward movement of said float at a predetermined position relative to said roof, a fixed datum means, a tape calibrated to measure float elevations against said datum means attached to said float and adjusted to indicate the depth of the supporting liquid beneath said roof when said float is moved upwardly to said predetermined position, and calibrated means cooperating with said datum means to measure the difference between the total depth of said roof and the distance moved by said float as it moves upwardly from its liquid-supported position within said aperture to said predetermined position, the difference so measured being proportional to the volume of stored liquid displaced by said roof.

References Cited in the file of this patent

UNITED STATES PATENTS

| | | |
|---|---|---|
| 1,682,286 | Kinzbach | Aug. 28, 1928 |
| 1,879,805 | Jones | Sept. 27, 1932 |
| 1,933,522 | Edwards | Oct. 31, 1933 |
| 2,237,461 | Tokheim | Apr. 8, 1941 |
| 2,377,288 | Wiggins | May 29, 1945 |
| 2,587,525 | Quist | Feb. 26, 1952 |
| 2,841,009 | Mayes | July 1, 1958 |

FOREIGN PATENTS

| | | |
|---|---|---|
| 923,609 | France | Feb. 24, 1947 |